US010608994B2

(12) United States Patent
Anderson et al.

(10) Patent No.: US 10,608,994 B2
(45) Date of Patent: Mar. 31, 2020

(54) SYSTEM FOR MANAGING COMMUNICATION PORTS BETWEEN SERVERS

(71) Applicant: Bank of America Corporation, Charlotte, NC (US)

(72) Inventors: Frederick L. Anderson, Buffalo Grove, IL (US); Leonard A. Loster, Chicago, IL (US); Robert W. Gallop, Colorado Springs, CO (US)

(73) Assignee: Bank of America Corporation, Charlotte, NC (US)

( * ) Notice: Subject to any disclaimer, the term of this patent is extended or adjusted under 35 U.S.C. 154(b) by 170 days.

(21) Appl. No.: 15/944,492

(22) Filed: Apr. 3, 2018

(65) Prior Publication Data

US 2019/0306121 A1    Oct. 3, 2019

(51) Int. Cl.

| H04L 29/06 | (2006.01) |
| H04L 29/08 | (2006.01) |
| H04L 12/24 | (2006.01) |
| H04L 29/12 | (2006.01) |
| G06F 16/27 | (2019.01) |

(52) U.S. Cl.
CPC ........ *H04L 63/0263* (2013.01); *G06F 16/275* (2019.01); *H04L 41/085* (2013.01); *H04L 61/6063* (2013.01); *H04L 63/0236* (2013.01); *H04L 67/1097* (2013.01)

(58) Field of Classification Search
CPC ............. G06F 17/30581; H04L 41/085; H04L 61/6063; H04L 63/0236; H04L 63/0263

USPC ......................................................... 726/11
See application file for complete search history.

(56) References Cited

U.S. PATENT DOCUMENTS

| 6,192,417 | B1 * | 2/2001 | Block | .................. H04L 12/1818 370/390 |
| 7,444,536 | B1 * | 10/2008 | Jairath | .................... G06F 9/465 714/4.11 |
| 2003/0084100 | A1 * | 5/2003 | Gahan | .................. G06F 11/2023 709/203 |
| 2006/0036715 | A1 * | 2/2006 | Ghattu | .................. H04L 67/125 709/220 |
| 2009/0113408 | A1 * | 4/2009 | Toeroe | .................. G06F 9/4406 717/168 |

(Continued)

FOREIGN PATENT DOCUMENTS

CN    106936896 A    7/2017

*Primary Examiner* — Haresh N Patel
(74) *Attorney, Agent, or Firm* — Michael A. Springs (57) ABSTRACT

A system for managing communication ports in a Kafka cluster is disclosed. The disclosed system receives a maintenance signal to shut down the Kafka cluster for maintenance. The Kafka cluster comprises a plurality of Kafka servers communicating with each other via a plurality of internal communication ports. In response to receiving the maintenance signal, the system shuts off a plurality of external communication ports arranged between the Kafka cluster and a plurality of external servers. Then, the system synchronizes the Kafka servers by replicating data among the Kafka servers. After determining that the Kafka servers are synchronized, the system shuts down the Kafka servers for maintenance. The internal communication ports are retained open when the system shuts down the external communication ports and during the maintenance.

20 Claims, 3 Drawing Sheets

(56) References Cited

U.S. PATENT DOCUMENTS

| | | | | |
|---|---|---|---|---|
| 2011/0276685 A1* | 11/2011 | de Waal | ............... | G06F 9/5072 |
| | | | | 709/224 |
| 2012/0023209 A1* | 1/2012 | Fletcher | ............ | H04L 12/40195 |
| | | | | 709/223 |
| 2012/0226918 A1* | 9/2012 | Rallo | ................... | G06F 1/3209 |
| | | | | 713/300 |
| 2014/0025736 A1* | 1/2014 | Wang | ..................... | H04L 45/46 |
| | | | | 709/204 |
| 2015/0121134 A1* | 4/2015 | Wipfel | ............... | G06F 11/2094 |
| | | | | 714/6.31 |
| 2016/0252953 A1* | 9/2016 | Rallo | ................... | G06F 1/3296 |
| | | | | 713/323 |
| 2016/0359806 A1* | 12/2016 | Lopez | ................ | H04L 63/0218 |
| 2017/0064027 A1 | 3/2017 | Grenader | | |
| 2017/0201556 A1 | 7/2017 | Fox et al. | | |
| 2017/0339238 A1 | 11/2017 | Qin | | |

\* cited by examiner

FIG. 1

INTERNAL COMMUNICATION PORTS:
    INTERNAL COMMUNICATION PORT 1= TCP://IP ADDRESS 1: PORT NUMBER 1
    INTERNAL COMMUNICATION PORT 2= TCP://IP ADDRESS 2: PORT NUMBER 2
    INTERNAL COMMUNICATION PORT 3= TCP://IP ADDRESS 3: PORT NUMBER 3
    INTERNAL COMMUNICATION PORT 4= UDP://IP ADDRESS 4: PORT NUMBER 4
    INTERNAL COMMUNICATION PORT 5= UDP://IP ADDRESS 5: PORT NUMBER 5

EXTERNAL COMMUNICATION PORTS:
    EXTERNAL COMMUNICATION PORT 1= TCP://IP ADDRESS 6: PORT NUMBER 6
    EXTERNAL COMMUNICATION PORT 2= TCP://IP ADDRESS 7: PORT NUMBER 7
    EXTERNAL COMMUNICATION PORT 3= UDP://IP ADDRESS 8: PORT NUMBER 8
    EXTERNAL COMMUNICATION PORT 4= UDP://IP ADDRESS 9: PORT NUMBER 9

SYSTEM FOR MANAGING COMMUNICATION PORTS BETWEEN SERVERS

TECHNICAL FIELD

This disclosure relates generally to managing communication ports, and more particularly to managing communication ports among Kafka servers and other servers.

BACKGROUND

Occasionally, a server may need to be shut down for maintenance. However, users may still write to the server when the server is shutting down. Shutting down the server while users are still writing to the server may cause problems such as data loss, file system inconsistency, etc. Therefore, it is desirable to find a way to prevent users from writing to the server when the server is shutting down.

SUMMARY

Occasionally, a server/cluster may need to be shut down for maintenance. However, users may still write to the server/cluster when the server/cluster is shutting down. When many users still write to the server/cluster when the server/cluster is shutting down, it results in a large amount of incomplete threads and partial messages in the server/cluster, leaving the server/cluster in an unhealthy state. After the maintenance is done and the server/cluster is brought back up, the server/cluster will try to resolve the incomplete threads using the partial messages. This may cause system errors and problems such as data loss, file system inconsistency, etc.

The present application discloses a system which provides a technical solution to preventing users from writing to the server/cluster when the server/cluster is shutting down.

In some embodiments, the disclosed system receives a maintenance signal to shut down a cluster for maintenance. The cluster may comprise a plurality of internal servers and a plurality of internal communication ports are arranged among the plurality of internal servers. In response to receiving the maintenance signal, the system shuts off a plurality of external communication ports that are arranged between the cluster and a plurality of external servers. The plurality of external communication ports are configured to support communication between the cluster and the plurality of external servers. The plurality of internal communication ports are retained open when the system shuts off the external communication ports. Then, the system synchronizes the plurality of internal servers by replicating data among the plurality of internal servers. Next, the system determines whether the plurality of internal servers are synchronized. In response to determining that the plurality of internal servers are synchronized, the system shuts down the plurality of internal servers for maintenance. Specifically, the system waits for a predetermined time duration to shut down the plurality of internal servers after shutting offthe plurality of external communication ports to allow synchronizing the internal servers.

If determining that the plurality of internal servers are not synchronized, the system passes data between one or more pair of the internal servers so that the data is replicated among the plurality of internal servers.

When determining that the maintenance is completed, the system restarts the plurality of internal servers. After restarting the plurality of internal servers, the system confirms whether the plurality of internal servers have been correctly synchronized. In response to determining that the plurality of internal servers have been correctly synchronized, the system reopens the plurality of external communication ports.

The plurality of internal servers may be Kafka servers. The plurality of external servers comprise at least one or more producer servers, one or more consumer servers, one or more stream servers, or one or more connector servers.

The disclosed system provides a technical solution directed to preventing users from writing to the cluster when the cluster is shutting down. Users writing to the cluster when the cluster is shutting down creates a technical problem that is inherently rooted in a computer technology and a computer network. For example, the cluster comprising many computers generally exchanges messages with external servers and/or users in a large volume (e.g., a million messages per second) over the computer network. When users still write to the cluster while the cluster is shutting down, it results in a large amount of incomplete threads and partial messages in the cluster, leaving the cluster in an unhealthy state. For example, it may cause system errors and problems such as data loss, file system inconsistency, etc.

The disclosed system solves the technical problem by shutting off external communication ports between the cluster and external servers, synchronizing the internal servers of the cluster, and then shutting down the internal servers. The disclosed system further checks whether the internal servers have been correctly synchronized before reopening the external communication ports and after the maintenance is over. This facilitates blocking users and/or external servers from writing to the cluster, keeping the internal servers at a common state while the cluster is shutting down, and reducing the risk of system errors and problems such as data loss and file system inconsistency. Therefore, the disclosed solution increases the robustness of the cluster and the accuracy of the data stored within the servers.

Note that the disclosed solution includes a specific set of rules to managing the communication ports and the maintenance of the cluster, such as the sequential steps of shutting off external communication ports between the cluster and external servers, synchronizing the internal servers of the cluster, and then shutting down the internal servers, checking whether the internal servers have been correctly synchronized before reopening the external communication ports and after the maintenance is over. The incorporation of these particular rules improves the existing technological process by allowing a period time for the cluster to synchronize before shutting down the cluster and after shutting off the external communication ports.

Furthermore, the disclosed system provides an unconventional technical solution to blocking user or servers from writing to the cluster while the cluster is shutting down. For example, the disclosed system manages the external communication ports and the internal communication ports in a certain way so that users and/or servers are blocked and the cluster is in a healthy state while in maintenance.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Figure 1:
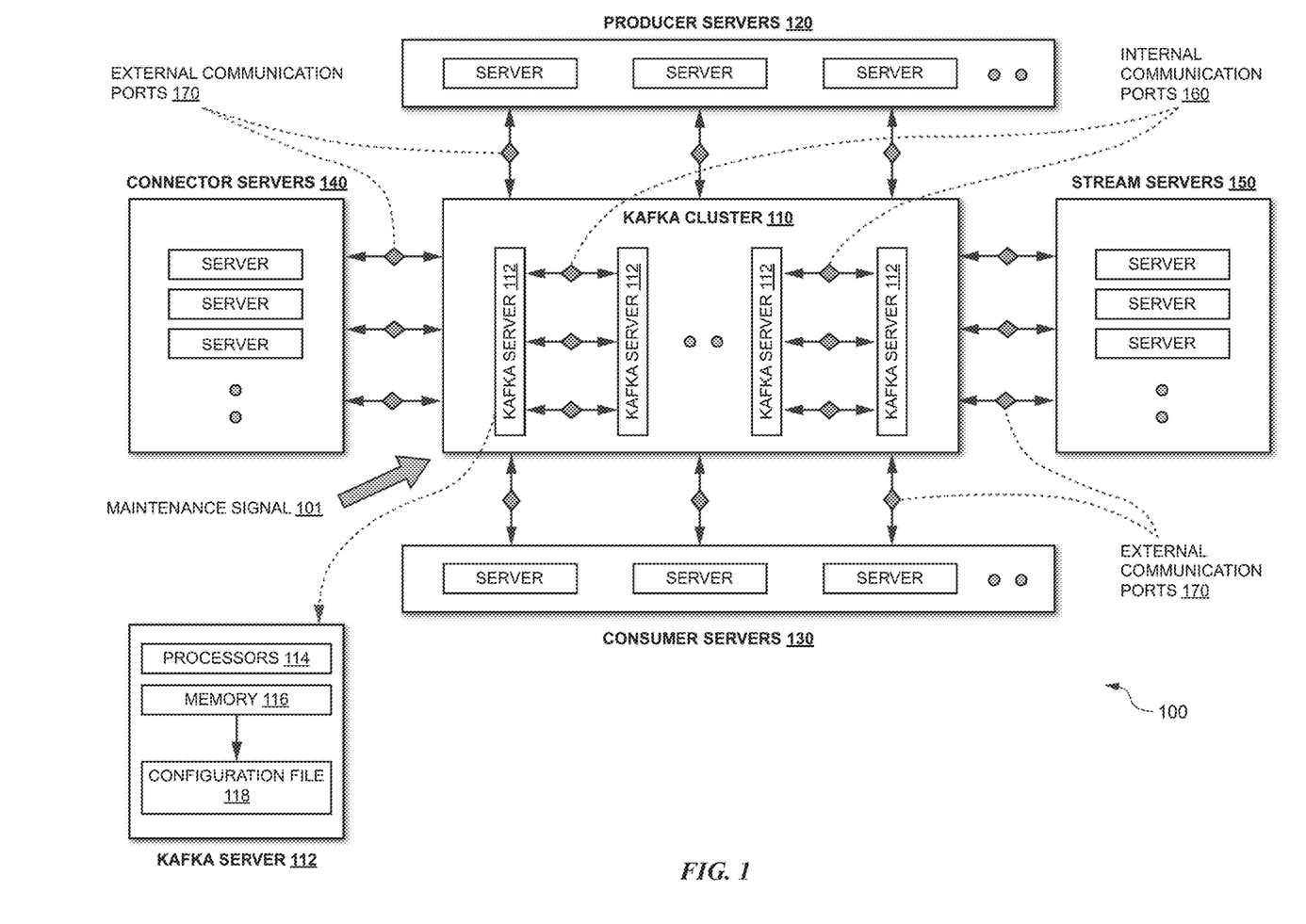
FIG. 1 illustrates an exemplary embodiment of a system for managing communication ports between servers, according to the present disclosure.

FIG. 1 illustrates an exemplary embodiment of a system 100 for managing communication ports, according to certain embodiments of the present disclosure. System 100 comprises a Kafka cluster 110 including a plurality of Kafka servers 112, one or more producer servers 120, one or more consumer servers 130, one or more connector servers 140, one or more stream servers 150, a plurality of internal communication ports 160, and a plurality of external communication ports 170.

System 100 may further comprise any other suitable type and/or number of network devices (not shown). Examples of other network devices include, but are not limited to, web clients, web servers, user devices, mobile phones, computers, tablet computers, laptop computers, software as a service (SaaS) servers, databases, file repositories, file hosting servers, and/or any other suitable type of network device. System 100 may be configured as shown or in any other suitable configuration. Modifications, additions, or omissions may be made to system 100. System 100 may include more, fewer, or other components. Any suitable component of system 100 may include a processor, interface, logic, memory, or other suitable element.

In general, system 100 maintains Kafka cluster 110 by managing internal communication ports 160 and external communication ports 170. In some embodiments, at least one of the Kafka servers 112 in Kafka cluster 110 receives a maintenance signal 101 to shut down Kafka cluster 110 and perform maintenance on Kafka cluster 110 (e.g., replace a hardware component or apply a software patch). In response to receiving the maintenance signal 101, system 100 shuts off external communication ports 170 arranged between Kafka cluster 110 and external servers (e.g., producer servers 120, consumer servers 130, connector servers 140, and stream servers 150). By shutting off external communication ports 170, system 100 blocks the external servers from writing to Kafka cluster 110. In some embodiments, internal communication ports 160 are retained open while Kafka cluster 110 is being shutting down and in maintenance. Then, system 100 synchronizes Kafka servers 112 by replicating data among Kafka servers 112. For example, system 100 may compare the data in each pair of Kafka servers 112, and copy the unmatched part of data from one Kafka server 112 to the other Kafka server 112 if determining that the two Kafka servers 112 do not have the same copy of data. Next, system 100 determines whether Kafka servers 112 are synchronized by determining whether all Kafka servers 112 have the same copy of data. If system 100 determines that a pair of Kafka servers 112 do not have the same copy of data, system 100 may copy the unmatched part of data from one Kafka server 112 to the other so that the two Kafka servers 112 have the same copy of data. System 100 may repeat the synchronization process until all Kafka servers 112 have been determined to have the same copy of data. In response to determining that Kafka servers 112 are synchronized, system 100 shuts down Kafka servers 112 for maintenance (e.g., replacing a hardware component or applying a software patch).

In response to determining that Kafka servers 112 are not synchronized, system 100 passes data between one or more pair of Kafka servers 112 so that the data is replicated among Kafka servers 112. For example, system 100 may determine that a pair of Kafka servers 112 do not have the same copy of data. System 100 may copy the unmatched part of data from one Kafka server 112 to the other so that the two Kafka servers 112 have the same copy of data.

After the maintenance is completed, system 100 restarts Kafka servers 112. For example, after replacing a hardware component or applying a software patch, system 100 determines that the maintenance is completed and restarts Kafka servers 112. After restarting Kafka servers 112, system 100 confirms whether Kafka servers 112 have been correctly synchronized. For example, system 100 determines whether all Kafka servers 112 have the same copy of data. In response to determining that Kafka servers 112 have been correctly synchronized, system 100 reopens external communication ports 170 to allow the external servers to resume communication with Kafka cluster 110. If system 100 determines that a pair of Kafka servers 112 do not have the same copy of data, system 100 may copy the unmatched part of data from one Kafka server 112 to the other so that the two Kafka servers 112 have the same copy of data.

Kafka cluster 110 is configured as a streaming platform to maintain and process streams of records. In some embodiments, each record includes a key, a value, and a time stamp. Kafka cluster 110 stores streams of records in categories called topics.

Figure 2:
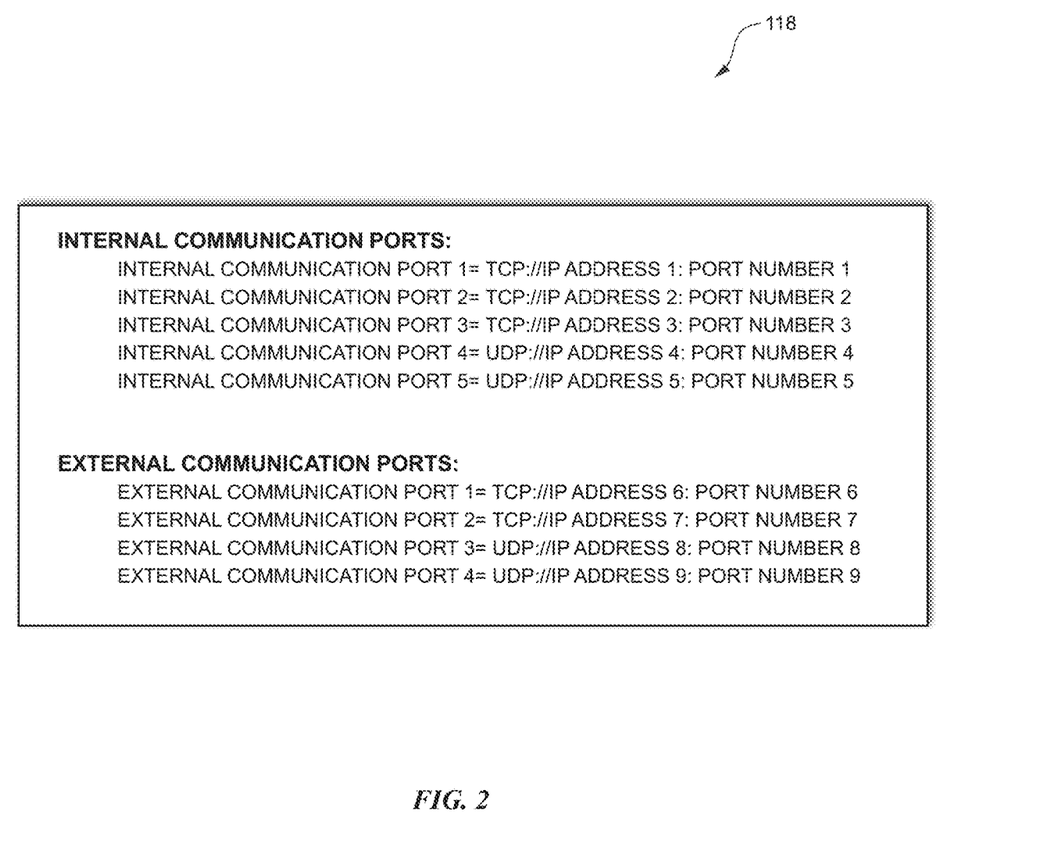
FIG. 2 illustrates an exemplary embodiment of a configuration file for managing communication ports between servers, according to the present disclosure.

In some embodiments, Kafka cluster 110 is a distributed system. The distributed nature of Kafka cluster 110 brings many technological advantages such as increased reliability, improved performance, and enhanced scalability. In some alternative embodiments, Kafka cluster 110 is a centralized system. The functions of Kafka cluster 110 may be performed by any suitable combination of one or more Kafka servers 112 or other elements at one or more locations. In some embodiments, as illustrated, Kafka cluster 110 includes a plurality of Kafka servers 112. Each Kafka server 112 comprises one or more processors 114 and a memory 116. Memory 116 is configured to store a configuration file 118. Configuration file 118 is configured to identify a plurality of internal communication ports 160 and a plurality of internal communication ports 170. Referring to FIG. 2, an exemplary embodiment of configuration file 118 includes a first set of communication ports that are identified as internal communication ports, including multiple transmission control protocol (TCP) ports and user datagram protocol (UDP) ports. Configuration file 118 further includes a second set of communication ports that are identified as external communication ports, including multiple transmission control protocol (TCP) ports and user datagram protocol (UDP) ports.

In general, Kafka cluster 110 has three key capabilities: (1) it allows a user or a server to publish and subscribe to a stream of records; (2) it allows a user or a server to store streams of records in a fault-tolerant way; and (3) it allows a user or a server to process streams of records as they occur. With these capabilities, Kafka cluster 110 can be used for building real-time streaming data pipelines that reliably get data between systems and applications, and for building real-time streaming applications that transform or react to the stream of data.

For example, Kafka cluster 110 may allow other servers (e.g., producer servers 120) to publish a stream of records to one or more Kafka topics. Data written to Kafka cluster 110 is written to disk and replicated for fault-tolerance. Kafka cluster 110 allows producer servers 120 to wait on acknowledgment so that a write isn't considered complete until it is fully replicated and guaranteed to persist even if the server written-to fails. Therefore, Kafka cluster 110 can be considered as a special purpose distributed file system dedicated to high-performance, low-latency storage, replication, and propagation.

As another example, Kafka cluster 110 may allow other servers (e.g., consumer servers) which subscribe to one or more Kafka topics to read a stream of records from Kafka cluster 110. In this way, Kafka cluster 110 can be also considered as a messaging system. However, unlike conventional messaging system, Kafka cluster 110 supports both queueing mode and publish-subscribe mode. For example, as with publish-subscribe, Kafka cluster 110 allows broadcasting messages to multiple consumer groups. Meanwhile, as with a queue, Kafka cluster 110 allows dividing processing over a collection of processes for the members of a particular consumer group. This provides parallelism in processing, thereby by reducing processing time and response time for Kafka cluster 110.

Producer servers 120 are configured to publish (e.g., write) streams of records to one or more Kafka topic. Producer servers 120 may include tools and libraries for publishing streams of data to Kafka topics in Kafka servers 112. For example, producer servers 120 may write messages (e.g., a stream of records) to one or more Kafka servers 112.

Consumer servers 130 are configured to subscribe to one or more Kafka topics and process the streams of records produced to them. Consumer servers 120 may include tools and libraries for reading streams of data from Kafka topics in Kafka servers 112. For example, consumer servers 130 may receive messages (e.g., a stream of records) from one or more Kafka servers 112.

Connector servers 140 are configured to connect Kafka topics to existing applications. Connector servers 140 may include tools and libraries for moving large collections of data from other systems (e.g., relational database management system (RDBMS), Hadoop) into Kafka cluster 110, and from Kafka cluster 110 to other systems. For example, connector servers 140 may take in data from a RDBMS (not shown), and ingest the data into Kafka cluster 110. As another example, connector servers 140 may take in data from Kafka cluster 110, and write the data into a Hadoop system (not shown).

Stream servers 150 are configured to consume an input stream of records from one or more Kafka topics and produce an output stream of records to one or more Kafka topics. Stream servers 150 may include tools and libraries for transforming streams of data from input Kafka topics to output Kafka topics. For example, stream servers 150 may read a first stream of records published to a first set of Kafka topics by producer servers 120, transform the first stream of records into a second stream of records, and write the second stream of records into a second set of Kafka topics subscribed by consumer servers 130.

Internal communication ports 160 are configured to support communications between Kafka servers 112. A pair of Kafka servers 112 may communicate with each other via one or more internal communication ports 160. Internal communication ports 160 comprise any appropriate hardware or software that act as an endpoint of communication in Kafka cluster 110. In some embodiments, internal communication ports 160 comprise serial communication interfaces (e.g., COM ports) between Kafka servers 112, including physical ports and virtual ports such as ports created by Bluetooth or USB-to-serial adapters. In some embodiments, internal communication ports 160 comprise parallel communication interfaces, including physical ports and virtual ports that support transferring multiple binary digits between Kafka servers 112. In some embodiments, each internal communication port 160 comprises a logical network interface associated with an IP address of a host which identifies the destination or origination network address of a message (e.g., a stream of records) transmitted between Kafka servers 112. In some embodiments, each internal communication port 160 is associated with a port number. In some embodiments, internal communication ports 160 comprise firewall ports, such as transmission control protocol (TCP) ports and user datagram protocol (UDP) ports, on an internal firewall (e.g., host-based firewall) of Kafka cluster 110.

External communication ports 170 are configured to support communications between external servers (e.g., producer servers 120, consumer servers 130, connector servers 140, and stream servers 150) and Kafka cluster 110. For example, a first set of external communication ports 170 may be dedicated for producer servers 120, a second set of external communication ports 170 may be dedicated for consumer servers 130, a third set of external communication ports 170 may be dedicated for connector servers 140, and a fourth set of external communication ports 170 may be dedicated for consumer servers 150. External communication ports 170 comprise any appropriate hardware or software that act as an endpoint of communication between external servers and Kafka cluster 110. Generally, external communication ports 170 are configured to allow access to a server's web interface, secure remote connections to a server, and provide certain features for Kafka servers 112 to access the local internet resources they need to function properly.

External communication ports 170 may comprise serial communication interfaces (e.g., COM ports), including physical ports and virtual ports such as ports created by Bluetooth or USB-to-serial adapters. External communication ports 170 may comprise parallel communication interfaces, including physical ports and virtual ports that support transferring multiple binary digits between external servers and Kafka cluster 110. Each external communication port 170 may comprise a logical network interface associated with an IP address of a host that identifies the destination or origination network address of a message (e.g., a stream of records) transmitted between external servers and Kafka servers 112. Each external communication port 170 may be associated with a port number. In some embodiments, external communication ports 170 comprise firewall ports, such as transmission control protocol (TCP) ports and user datagram protocol (UDP) ports, on an external firewall (e.g., network-based firewall) of Kafka cluster 110.

A server described in the present disclosure may include hardware, software, or other server(s). A server may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a server may be performed by any suitable combination of one or more servers or other elements at one or more locations.

A processor described in the present disclosure may comprise any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor may be a programmable logic device, a microcontroller, a microprocessor, or any suitable combination of the preceding. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

A memory described in the present disclosure may comprise any device operable to store, either permanently or temporarily, data, operational software, or other information for a processor. In some embodiments, the memory comprises one or more disks, tape drives, or solid-state drives, and may be used as an over-flow data storage device, to store programs when such programs are selected for execution, and to store instructions and data that are read during program execution. The memory may comprise any one or a combination of volatile or non-volatile local or remote devices suitable for storing information. For example, the memory may comprise random access memory (RAM), read only memory (ROM), magnetic storage devices, optical storage devices, semiconductor storage devices, or any other suitable information storage device or a combination of these devices.

Figure 3:
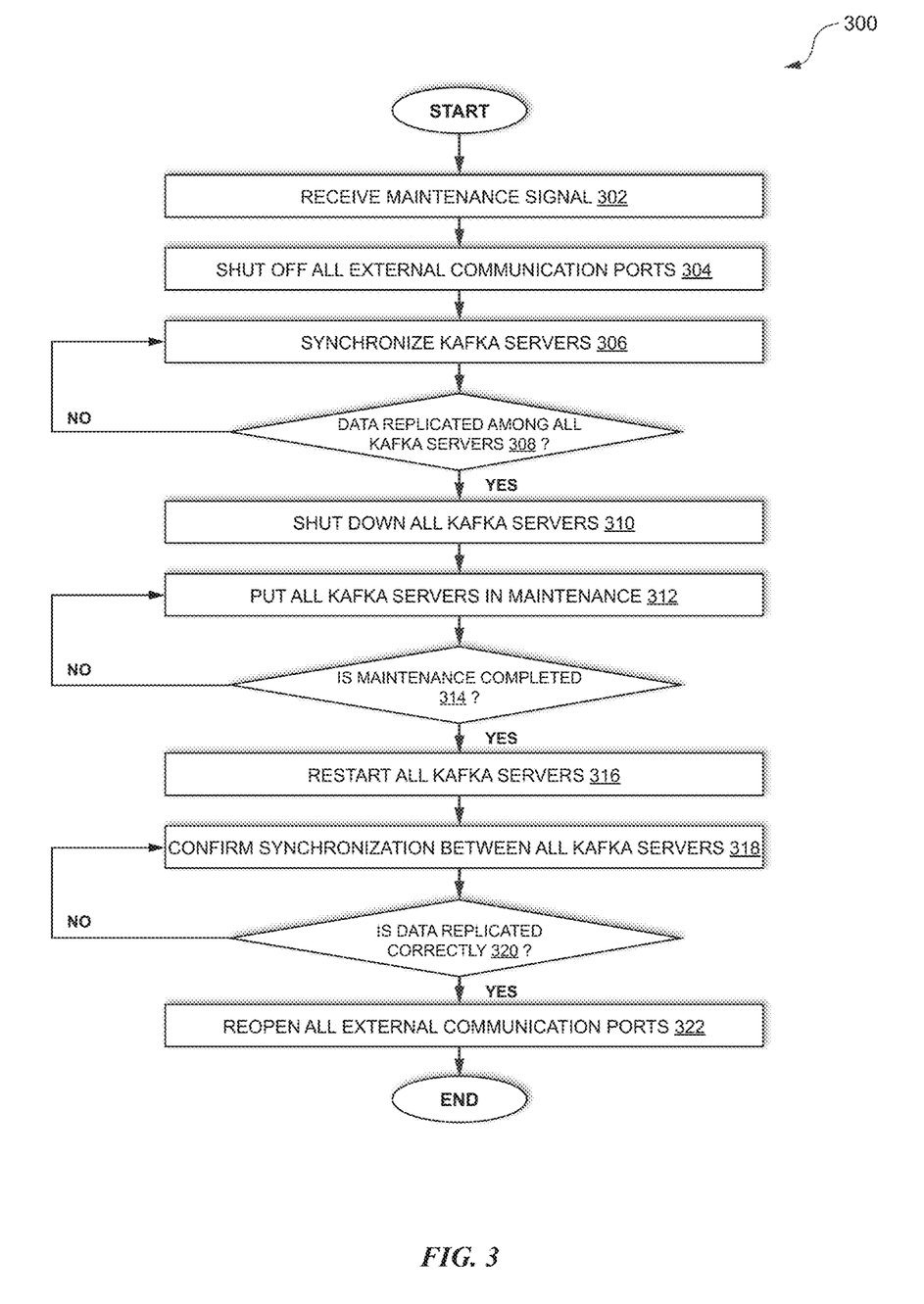
FIG. 3 presents a flow chart illustrating an exemplary embodiment of a method of managing communication ports between servers, according to the present disclosure.

FIG. 3 presents a flow chart illustrating an exemplary embodiment of a method 300 of managing communication ports between servers in system 100. The following is a non-limiting example that illustrates how system 100 implements method 300.

First, system 100 receives a maintenance signal 101 to shut down Kafka cluster 110 for maintenance (step 302). In some embodiments, Kafka cluster comprises a plurality of Kafka servers 112. At least one of the Kafka servers 112 receives the maintenance signal 101 to shutdown Kafka cluster 110. In some embodiments, Kafka cluster 110 receives the maintenance signal 101 periodically (e.g., once a week, once a month). In some embodiments, the maintenance includes replacing a hardware component and/or applying a software patch in Kafka cluster 110.

A plurality of internal communication ports 160 are arranged among the plurality of Kafka servers 112. For example, a given pair of Kafka servers 112 communicate with each other via one or more of the internal communication ports 160. In some embodiments, internal communication ports 160 include certain TCP and/or UDP ports assigned to support communications between Kafka servers 112.

Additionally, a plurality of external communication ports 170 are arranged between Kafka cluster 110 and external servers including producer servers 120, consumer servers 130, connector servers 140, and stream servers 150. The external servers communicate with (e.g., publish to or read from) Kafka cluster 110 via the external communication ports 170. In some embodiments, internal communication ports 160 include certain TCP and/or UDP ports assigned to support communications between the external servers and Kafka cluster 110.

Shutting down Kafka cluster 110 while external communication ports 170 are open may result in large amount of incomplete threads and partial messages, thereby creating serious problems to Kafka cluster 110, such as system errors, data loss, and file system inconsistency.

In response to receiving the maintenance signal, system 100 shuts off external communication ports 170 arranged between Kafka cluster 110 and external servers (e.g., producer servers 120, consumer servers 130, connector servers 140, and stream servers 150) (step 304). By shutting off external communication ports 170, system 100 blocks the external servers from writing to Kafka cluster 110. In some embodiments, referring to FIG. 2, system 100 reads a configuration file 118 stored in one Kafka server 112 and identifies external communication ports 170, such as certain TCP and/or UDP ports assigned to support communications between the external servers and Kafka cluster 110.

For example, system 100 shuts off external communication ports 170 by disabling a number of TCP ports and/or UDP ports on an external firewall (e.g., network-based firewall) of Kafka cluster 110 which are assigned to support communications between the external servers and Kafka cluster 110. By shutting off external communication ports 170, system 100 enables blocking external servers from writing to Kafka cluster 110 and blocking external servers from reading from Kafka cluster 110.

In some embodiments, internal communication ports 160 are retained open while system 100 shuts off external communication port 170. This allows Kafka cluster 110 to synchronize Kafka servers 112. For example, system 100 may compare the data in each pair of Kafka servers 112, and copy the unmatched part of data from one Kafka server 112 to the other Kafka server 112 if determining that the two Kafka servers 112 do not have the same copy of data. In some embodiments, internal communication ports 160 include TCP ports and/or UDP ports on an internal firewall (e.g., host-based firewall) of Kafka cluster 110 which are assigned to support communications between Kafka servers 112.

Then, system 100 synchronizes Kafka servers 112 by replicating data among Kafka servers 112 (step 306). For example, system 100 may compare the data in each pair of Kafka servers 112. If determining that the two Kafka servers 112 do not have the same copy of data, system 100 copies the unmatched part of data from one Kafka server 112 to the other Kafka server 112 so that the two Kafka servers 112 have the same copy of data. System 100 may repeat the synchronization process until all Kafka servers 112 have the same copy of data. System 100 may keep certain TCP ports and/or UDP ports on an internal firewall (e.g., a host-based firewall) open to allow Kafka servers 112 passes data via those ports. Synchronizing Kafka server 112 facilitates establishing consistency among data stored in the servers. In some embodiments, the synchronization process of Kafka servers 112 lasts for a short time duration (e.g., less than 1 minute).

Next, system 100 determines whether data has been replicated among Kafka servers 112 (308). In some embodiments, Kafka servers 112 compare data and determine whether all Kafka server 112 have the same copy of data. For example, Kafka servers 112 may compare files to determine whether all Kafka servers 112 have an exact copy of the files. As another example, Kafka servers 112 may compare versions of a file to determine whether all versions of the file have been synchronized over all Kafka servers 112.

If system 100 determines that data have not been replicated among Kafka servers 112, system 100 may return to step 306 and pass data between one or more pair of Kafka servers 112 so that the data is replicated among the servers.

In response to determining that data has been replicated among Kafka servers 112, system 100 proceeds to step 310 to shut down Kafka servers 112 and then puts Kafka servers 112 in maintenance (step 312). In some embodiments, system 100 shuts down Kafka server 112 simultaneously. In other embodiments, system 100 shuts down Kafka server 112 sequentially based on synchronization time for a particular Kafka server 112. In some embodiments, the maintenance includes replacing a hardware component and/or applying a software patch in Kafka cluster 110.

Note that system 100 waits for a predetermined time duration to shut down Kafka servers 112 after shutting off external communication ports 170. This allows Kafka servers 112 to replicate data, clean incomplete threads, and/or drop partial messages, thereby putting Kafka cluster 110 in a healthy state.

System 100 then determines whether the maintenance is completed (step 314). In some embodiments, system 100 determines whether a predetermined time duration (e.g., an hour) has lapsed after shutting down Kafka servers 112. If system 100 determines that the predetermined time duration has lapsed after shutting down Kafka servers 112, system 100 determines that the maintenance is completed.

In some embodiments, system 100 determines whether the maintenance is completed by determining whether a hardware component has been replaced and/or whether a software patch has been applied in Kafka cluster 110.

Upon determining that the maintenance is completed, system 100 restarts Kafka servers 112 (step 316).

In some embodiments, after restarting Kafka servers 112, system 100 confirms whether Kafka servers 112 have been correctly synchronized (step 318). In some embodiments, Kafka servers 112 compare data and determine whether all Kafka servers 112 have the same copy of data (step 320). For example, Kafka servers 112 may compare files to determine whether all Kafka servers 112 have an exact copy of the files. As another example, Kafka servers 112 may compare versions of a file to determine whether all versions of the file have been synchronized over all Kafka servers 112.

In response to determining that Kafka servers 112 have been correctly synchronized, system 100 reopens external communication ports 170 (step 322). For example, after determining that every Kafka server 112 has the same versions of files, system 100 enables the TCP ports and/or UDP ports that are assigned to support communications between the external servers and Kafka cluster 110.

The disclosed method of managing the communication ports and the maintenance of the cluster, including the sequential steps of shutting off external communication ports between the cluster and external servers, synchronizing the internal servers of the cluster, and then shutting down the internal servers, checking whether the internal servers have been correctly synchronized before reopening the external communication ports and after the maintenance is over, facilitates blocking users and/or external servers from writing to and reading from the cluster, keeping the internal servers at a common state while the cluster is shutting down, and reducing the risk of system errors and problems such as data loss and file system inconsistency. Therefore, the disclosed system and method increases the robustness of Kafka cluster 110.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for managing communication ports between servers, comprising:
   a cluster comprising a plurality of internal servers;
   a plurality of internal communication ports arranged among the plurality of internal servers, wherein a given pair of the internal servers communicate with each other via one or more of the internal communication ports;
   a plurality of external servers commutatively coupled to the cluster; and
   a plurality of external communication ports arranged between the plurality of external servers and the plurality of internal servers, the plurality of external communication ports configured to support communication between the plurality of external servers and the plurality of internal servers;
   wherein at least one of the internal servers comprises one or more processors, the one or more processors operable to:
      receive a maintenance signal to shut down the plurality of internal severs for maintenance;
      shut off the plurality of external communication ports, wherein the plurality of internal communication ports are retained open;
      synchronize the plurality of internal servers by replicating data among the plurality of internal servers;
      determining whether the plurality of internal servers are synchronized; and
      upon determining that the plurality of internal servers are synchronized, shut down the plurality of internal servers for maintenance.

2. The system of claim 1, wherein the plurality of internal servers wait for a predetermined time duration to be shut down after the plurality of external communication ports are shut off.

3. The system of claim 1, wherein the one or more processors are further operable to:
   upon determining that the plurality of internal servers are not synchronized, pass data between one or more pair of the internal servers so that the data is replicated among the plurality of internal servers.

4. The system of claim 1, wherein the one or more processors are further operable to:
   determine whether the maintenance is completed; and upon determining that the maintenance is completed, restart the plurality of internal servers.

5. The system of claim 4, wherein the one or more processors are further operable to:
after restarting the plurality of internal servers, confirm whether the plurality of internal servers have been correctly synchronized; and
upon determining that the plurality of internal servers have been correctly synchronized, reopen the plurality of external communication ports.

6. The system of claim 1, wherein at least one of the internal servers further comprises a configuration file that identifies:
the plurality of external communication ports between the plurality of external servers and the plurality of internal servers; and
the plurality of internal communication ports among the plurality of internal servers.

7. The system of claim 1, wherein:
the plurality of internal servers comprise a plurality of Kafka servers; and
the plurality of external servers comprise at least:
one or more producer servers;
one or more consumer servers;
one or more stream servers; or
one or more connector servers.

8. A server for managing communication ports, comprising:
a memory operable to store instructions; and
one or more processors communicatively coupled to the memory, and when executing the instructions, operable to:
receive a maintenance signal to shut down a cluster for maintenance, wherein the cluster comprises the server and one or more internal servers, wherein a plurality of internal communication ports are arranged among the server and the one or more internal servers;
shut off a plurality of external communication ports, wherein the plurality of external communication ports are arranged between the cluster and a plurality of external servers, wherein the plurality of external communication ports are configured to support communication between the cluster and the plurality of external servers, wherein the plurality of internal communication ports are retained open;
synchronize the server and the one or more internal servers by replicating data among the server and the one or more internal servers;
determining whether the server and the one or more internal servers are synchronized; and
upon determining that the server and the one or more internal servers are synchronized, shut down the server and the one or more internal servers for maintenance.

9. The server of claim 8, wherein the server and the one or more internal servers wait for a predetermined time duration to be shut down after the plurality of external communication ports are shut off.

10. The server of claim 8, wherein the one or more processors are further operable to:
upon determining that the plurality of internal servers are not synchronized, pass data between the server and the one or more internal servers so that the data is replicated among the server and the one or more internal servers.

11. The server of claim 8, wherein the one or more processors are further operable to:
determine whether the maintenance is completed; and
upon determining that the maintenance is completed, restart the server and the one or more internal servers.

12. The server of claim 11, wherein the one or more processors are further operable to:
after restarting the server and the one or more internal servers, confirm whether the server and the one or more internal servers have been correctly synchronized; and
upon determining that the server and the one or more internal servers have been correctly synchronized, reopen the plurality of external communication ports.

13. The server of claim 8, wherein the memory is further configured to store a configuration file that identifies:
the plurality of external communication ports between the plurality of external servers and the cluster; and
the plurality of internal communication ports among the server and the one or more internal servers.

14. The server of claim 8, wherein:
the server and the one or more internal servers comprise Kafka servers; and
the plurality of external servers comprise at least:
one or more producer servers;
one or more consumer servers;
one or more stream servers; or
one or more connector servers.

15. A method for managing communication ports, comprising:
receiving a maintenance signal to shut down a cluster for maintenance, wherein the cluster comprises a plurality of internal servers, wherein a plurality of internal communication ports are arranged among the plurality of internal servers;
shutting off a plurality of external communication ports, wherein the plurality of external communication ports are arranged between the cluster and a plurality of external servers, wherein the plurality of external communication ports are configured to support communication between the cluster and the plurality of external servers, wherein the plurality of internal communication ports are retained open;
synchronizing the plurality of internal servers by replicating data among the plurality of internal servers;
determining whether the plurality of internal servers are synchronized; and
upon determining that the plurality of internal servers are synchronized, shutting down the plurality of internal servers for maintenance.

16. The method of claim 15, wherein the plurality of internal servers wait for a predetermined time duration to be shut down after the plurality of external communication ports are shut off.

17. The method of claim 15, wherein the method further comprises:
upon determining that the plurality of internal servers are not synchronized, passing data between one or more pair of the internal servers so that the data is replicated among the plurality of internal servers.

18. The method of claim 15, wherein the method further comprises:
determining whether the maintenance is completed; and
upon determining that the maintenance is completed, restarting the plurality of internal servers.

19. The method of claim 18, wherein the method further comprises:

after restarting the plurality of internal servers, confirming whether the plurality of internal servers have been correctly synchronized; and upon determining that the plurality of internal servers have been correctly synchronized, reopening the plurality of external communication ports.

20. The method of claim 15, wherein:

the plurality of internal servers comprise Kafka servers; and the plurality of external servers comprise at least:
- one or more producer servers;
- one or more consumer servers;
- one or more stream servers; or
- one or more connector servers.

* * * * *